United States Patent [19]

Ham et al.

[11] Patent Number: 4,678,601

[45] Date of Patent: Jul. 7, 1987

[54] ELECTROCONDUCTIVE POLYMER-LATEX COMPOSITES

[75] Inventors: George E. Ham; Wuu-Nan Chen; John M. McIntyre, all of Lake Jackson, Tex.

[73] Assignee: The Dow Chemical Company, Midland, Mich.

[21] Appl. No.: 776,199

[22] Filed: Sep. 16, 1985

[51] Int. Cl.⁴ ............................................. A01B 1/00
[52] U.S. Cl. .................................. 252/500; 252/518; 524/412; 524/80
[58] Field of Search ....................... 252/500, 512, 518; 524/80, 401, 412, 236

[56] References Cited

U.S. PATENT DOCUMENTS

| | | | |
|---|---|---|---|
| 3,383,435 | 5/1968 | Cizek | 260/874 |
| 3,708,455 | 1/1973 | Nakanishi et al. | 260/37 R |
| 3,833,688 | 9/1974 | Abolins et al. | 260/876 R |
| 4,280,950 | 7/1981 | Nagata et al. | 260/42.21 |
| 4,394,304 | 7/1983 | Wrek | 252/500 |
| 4,395,512 | 7/1983 | Kubota et al. | 524/413 |
| 4,421,883 | 12/1983 | Cooper et al. | 524/127 |
| 4,510,075 | 4/1985 | Lee et al. | 252/512 |
| 4,510,076 | 4/1985 | Lee et al. | 252/518 |
| 4,565,650 | 1/1986 | Francois | 252/518 |

*Primary Examiner*—Josephine L. Barr
*Attorney, Agent, or Firm*—W. J. Lee; G. W. Rhodes

[57] ABSTRACT

An electrically conductive polymer-latex composite is described. Organic polymeric material capable of being doped to provide an organic electroconductive material is dispersed in a latex and doped to provide an organic electroconductive polymer-latex composite.

15 Claims, No Drawings

ELECTROCONDUCTIVE POLYMER-LATEX COMPOSITES

BACKGROUND

The present invention relates generally to conductive polymers. Specifically, the present invention provides a polymer-latex composite comprising an organic polymeric material dispersed in a latex which is doped to provide an electroconductive polymer-latex composite. The latex effectively serves as a carrier for the polymeric material.

Conductive polymers are well known in the art. They have found uses in making moldable semiconductors and active elements for electronic devices, for example, active elements in electrophotographic copying machines.

Conductive polymers are generally prepared from backbone polymers, such as polyacetylene, which are made electrically conductive by molecular doping of the polymer. Effective doping agents are generally strong reducing or oxidizing agents. Common dopants used include p-tetracyanoquinodimethane (TCNQ), arsenic pentafluoride, and iodine. By doping polymers with these dopants, nominally semiconducting or insulating materials can be made into semiconducting and metallic-like materials. Such materials provide the advantages of the low cost, light weight, moldability and flexibility of polymers along with the desirable properties of electrical conductors.

Although films of electroconductive polymers provide these advantages, they suffer from several disadvantages in certain physical properties. For example, films of polyacetylene are very thin and often brittle. Consequently, they often flake and crumble making them unsuitable for many applications. It has also been observed that films of polyacetylene, after doping, are very sensitive to air and become non-conductive after only a few days. This is believed to be caused by oxidation of the activated polymer.

What is desired is a conductive polymer that retains its electrical properties for a longer period of time when exposed to air. In addition, it is desired to have a conductive polymer which is less brittle and therefore much more easily fabricated into a variety of film shapes.

SUMMARY

The present invention provides a unique, electrically conductive, polymer-latex composite comprising an organic polymeric electroconductive material, a latex capable of mixing with and dispersing the organic electroconductive material and a dopant.

In one embodiment of the present invention an initially undoped organic electroconductive material in powder form is mixed with a water-based latex, then spread and solidified by drying. The resulting film is doped to provide an electrically conductive film, which is non-brittle, easily fabricated into a variety of film shapes, and retains its electrical conductivity for an extended amount of time. These unique composites are useful for various applications, such as providing coatings for articles sensitive to electrostatic charges, or as catalyst electrodes.

DETAILED DESCRIPTION AND PREFERRED EMBODIMENT

The present invention provides unique electroconductive polymer-latex composites comprising an organic polymeric material, a latex and a dopant.

The latex component of the composite can be any appropriate latex material. Latex is a white, tacky aqueous suspension of a hydrocarbon polymer occurring naturally in some species of trees, shrubs or plants. In addition, latex can be manufactured synthetically. These elastomers are made generally by emulsion polymerization techniques from styrene-butadiene copolymer, acrylate resins, polyvinyl acetate and similar materials. The solid, or polymer, component of a latex emulsion is also commonly referred to as latex, especially after the liquid component has been removed.

Either a natural or synthetic latex can be employed in the present invention. In a preferred embodiment of the present invention, a styrene-butadiene or acrylic latex is employed.

The organic electroconductive material of the present invention can be a variety of organic materials characterized generally as poly-conjugated unsaturated materials. Such materials include, but are not limited to, polyacetylene, polyphenylene, polyphenylene-sulfide, polysubstituted acetylenes, copolymers of these and the like. In a preferred embodiment of the present invention, polyacetylene is employed.

In preparing the polymer-latex composite, the organic material is first ground into a powder. The powder is then mixed with the water-based latex material. Only shaking is required to completely disperse the powder in the latex. It is believed that the polymer material occludes to latex particles to provide a stable dispersion. In this way the latex serves as a carrier for the organic material. The mixture of the originally white latex and, for example, black polyacetylene powder produces a composite having a bluish, metallic tint.

A variety of dopants can be employed in the present invention, including but not limited to, chlorine, bromine, iodine, arsenic pentafluoride, p-tetracyanoquinodimethane and the like. The simplest dopants would be strong acids such as hydrochloric acid, hydrobromic acid or similar acids.

The method of doping the composite is not limited to any one technique. For example, if the dopant is in solution, it can be added directly to the latex and mixed. In another method, the polymer-latex composite can be exposed to, for example, a chlorine vapor atmosphere. In a preferred embodiment of the invention, the polymer-latex composite is spread and solidified by drying on a substrate, then exposed to an iodine vapor atmosphere.

The following examples are given to more fully illustrate the invention and shall not be construed as limiting the scope of the invention.

EXAMPLES

EXAMPLE 1

Preparation of polyacetylene was conducted as follows: Sodium borohydride (0.1442 g) was dissolved in 50 ml of isopropanol and the solution cooled in a dry-ice/acetone bath to about $-75°$ C. A 1 wt. % solution (1.5 ml) of $Co(NO_3)_2$ in ethanol was added. Acetylene gas was added to the solution and the dark, brown to black polyacetylene began to immediately precipitate.

The mixture was filtered and the black polyacetylene powder was washed with iso-propanol and then dried.

EXAMPLE 2

The polyacetylene powder prepared according to Example 1 was dispersed in an aqueous styrene-butadiene latex, spread as a film and allowed to dry overnight in air. The dried film was then placed in a jar containing a single crystal (~1 g) of $I_2$ and allowed to stand overnight in the $I_2$ vapor. Pressing the leads of a digital ohm meter into the treated film resulted in a current flow and a resistance measurement in the 5-10 megaohms range.

EXAMPLE 3

Preparation of polyacetylene was conducted as follows: To a mixture of 1600 cc of toluene, 64 cc of a 25.1 wt. % $AlEt_3$ in toluene and 1.6 cc of $Ti(OBu)4$ was added acetylene gas at room temperature. The black precipitate which formed was filtered and washed with copious amounts of toluene to remove the catalyst. The resulting black powder was then dried.

EXAMPLE 4

To 1.0 g of the polyacetylene prepared according to Example 3 was added 9.0 g of Dow Latex 620, which is a 50 wt. % aqueous emulsion of a styrene-butadiene polymer. The mixture was shaken until a uniform dispersion was obtained. This mixture was spread on a microscope slide, labeled "B" and allowed to dry overnight.

Similarly, Dow Latex 620 containing no polyacetylene was spread on a microscope slide and polyacetylene powder sifted onto the surface. After drying overnight, this provided a film of the polyacetylene alone (i.e., not dispersed in the polymer). This slide was labeled "D."

Similarly, Dow Latex 620 alone was spread on a microscope slide and used as a control. This slide was labeled "C."

The three slides were placed in an $I_2$ vapor atmosphere overnight. The next day the electrical conductivity of each was measured using the 4-probe method described by L. B. Valdes, Proc. I.R.E. 42, 420 (Feb. 1954), for such conductivity measurements on semiconductors. They were also measured the following day to compare the samples with respect to the amount of conductivity retained on aging. The results are depicted in Table I.

TABLE I

| Sample | Time, Hr. | Conductivity, $ohm^{-1}cm^{-1}$ | % Conductivity Retained |
|---|---|---|---|
| B | 0 | $4.48 \times 10^{-5}$ | — |
|   | 24 | $3.577 \times 10^{-5}$ | 79.8% |
| D | 0 | $1.793 \times 10^{-5}$ | — |
|   | 24 | $3.322 \times 10^{-6}$ | 18.5% |

Control sample "C" was non-conductive.

EXAMPLE 5

Polyacetylene prepared according to Example 3 (3.38 g) was mixed intimately with Dow Latex 620 (8.22 g) to give a uniformly dispersed paste-like material which had a bluish sheen in color. This material was used as an electrode catalyst in the following manner. The paste was applied by brush onto a 1.5 cm×4 cm silver screen (40×40 mesh - 0.010 inch wire), filling the holes and coating the surface. The resulting electrodes were allowed to dry for a few days. One electrode prepared in this manner was doped with iodine by a procedure described by P. J. Nigrey, et al., in *Journal Chemical Society Chemical Communications,* 594 (1979). This involved using it as an anode in a 0.5 molar potassium iodide solution (200 ml) for 30 minutes at a cell voltage of 9 volts. The doped and undoped polyacetylene electrodes were tested as cathodes along with a silver screen electrode and a platinum screen electrode in a 2 molar sodium hydroxide aqueous catholyte at 25° C. A standard "H" cell with a NAFION 324 ion exchange membrane separator (manufactured by DuPont), platinum screen anode, and 2 molar sodium hydroxide anolyte at 25° C. was used to conduct cyclic voltametry studies. The cathodes were cycled between −0.9 volts and −1.6 volts versus a saturated calomel reference electrode, S.C.E., while current-voltage graphs were recorded. The cathodes were pre-electrolyzed for 3 minutes at −2.0 volts to clean any $Ag_2O$ from the silver surface. Afterwards, the cyclic voltamographs were recorded at a scan rate of 2 millivolts per second. The current posted at a given cathode potential is representative of the catalytic nature of the electrode; i.e., more current means a better electrocatalyst. The results are depicted in Table II.

TABLE II

| Cathode Materials | Current Milliamps/Centimeters$^2$ at | | |
|---|---|---|---|
|  | −1.4 | −1.5 | −1.6 volts vs. SCE |
| Undoped polyacetylene | 0 | 1.5 | 2.5 |
| Iodine doped polyacetylene | 1.5 | 4.5 | 16 |
| Silver | 1 | 2 | 4 |
| Platinum | 7 | 26 | 100 |

This data shows that undoped polyacetylene is not an electrocatalyst for the hydrogen evolution reaction in a sodium hydroxide electrolyte. The small amount of current flow observed is apparently due only to interaction at that fraction of the silver surface to which the electrolyte may permeate the coating and migrate. However, iodine doped polyacetylene exhibited much greater activity over silver. In this case the reaction is apparently taking place only at the polyacetylene surface. None were as good as platinum, which is reported to be one of the best electrocatalysts for this reaction. However, use of platinum is often prohibitive due to its cost.

Also, materials other than silver may be used as supports for the conductive polymer/latex composites of the invention. Thus, the use of good electrical conductors such as copper, steel, conductive carbon and the like is also contemplated. The conductor in this context serves as a current collector.

What is claimed is:

1. A polymer-latex composite comprising:
   (a) a poly-conjugated unsaturated organic polymeric material capable of being doped to provide an organic electroconductive material;
   (b) a latex into which the organic polymeric material is dispersed; and
   (c) a dopant in an amount sufficient to make the organic polymeric material electroconductive.
2. The composite of claim 1 wherein the organic polymeric material is selected from the group comprising polyacetylene, polyphenylene, polyphenylene-sulfide, polysubstituted acetylenes and their copolymers.
3. The composite of claim 1 wherein the latex is selected from the group comprising styrene-butadiene latex, acrylic latex or natural latex.

4. An electrically conductive polymer-latex composite comprising:
   (a) a styrene-butadiene or acrylic latex;
   (b) an organic polymeric material selected from the group comprising polyacetylene, polyphenylene, polyphenylene-sulfide, polysubstituted acetylenes and their copolymers dispersed in the latex; and
   (c) a dopant in an amount sufficient to make the organic polymeric material electroconductive.

5. The composite of claim 4 wherein said dopant is selected from the group comprising chlorine, bromine, iodine, arsenic pentafluoride, p-tetracyanoquinodimethane.

6. An electrically conductive polyacetylenelatex composite comprising:
   (a) styrene-butadiene latex;
   (b) polyacetylene dispersed in the latex; and
   (c) an iodine dopant in an amount sufficient to make the polyacetylene electroconductive.

7. A method of preparing an electrically conductive polymer-latex composite comprising:
   (a) mixing a poly-conjugated unsaturated organic polymeric material with a latex; and
   (b) doping the mixture with a dopant in an amount sufficient to make the organic polymeric material electroconductive.

8. An electroconductive polymer-latex electrocatalyst comprising:
   (a) an electrically conductive substrate;
   (b) a latex on the surface of the substrate;
   (c) a poly-conjugated unsaturated organic polymeric material dispersed in the latex and capable of being doped to become electroconductive;
   (d) a dopant in an amount sufficient to make the organic polymeric material electroconductive in contact with the dispersion.

9. A method of preparing an electrically conductive polymer-latex composite comprising:
   (a) dispersing a poly-conjugated unsaturated organic polymer in an aqueous latex suspension; and
   (b) contacting a dopant with the dispersed polymer in an amount sufficient to make the polymer electroconductive.

10. The method of claim 9 which includes the step of solidifying the resulting dispersion to produce a solid composite of said latex and said polymer.

11. The method of claim 10 in which the dispersion is solidified by spreading and drying to form a film of said composite.

12. The method of claim 10 in which the polymer is doped by applying dopant to the surface of said solid composite.

13. The method of claim 11 in which the polymer is doped by applying a dopant to the surface of said film.

14. The method of claim 9 in which the dopant is contacted with the polymer by mixing the dopant with the latex.

15. A method of preparing a doped blend of a polymer-latex comprising:
   (a) dispersing an organic polymer selected from the group comprising polyacetylene, polyphenylene, polyphenylene-sulfide, polysubstituted acetylenes and their copolymers in a latex;
   (b) casting a film or sheet of the dispersion;
   (c) drying the cast film or sheet of the dispersion; and
   (d) doping the orgainc polymer with a dopant in an amount sufficient to make the resulting product electroconductive, said dopant selected from the group comprising chlorine, bromine, iodine, arsenic penta-fluroide, p-tetracyanoquinodimethane.

* * * * *

UNITED STATES PATENT AND TRADEMARK OFFICE
CERTIFICATE OF CORRECTION

PATENT NO. : 4,678,601

DATED : July 7, 1987

INVENTOR(S) : George E. Ham; Wuu-Nan Chen & John M. McIntyre

It is certified that error appears in the above-identified patent and that said Letters Patent is hereby corrected as shown below:

Col. 6, line 33, "orgainc" should be --organic--.

Col. 6, line 37, "penta-fluroide," should be --penta-fluoride,--.

Signed and Sealed this

Twelfth Day of January, 1988

Attest:

DONALD J. QUIGG

*Attesting Officer*   *Commissioner of Patents and Trademarks*